Figure 1:
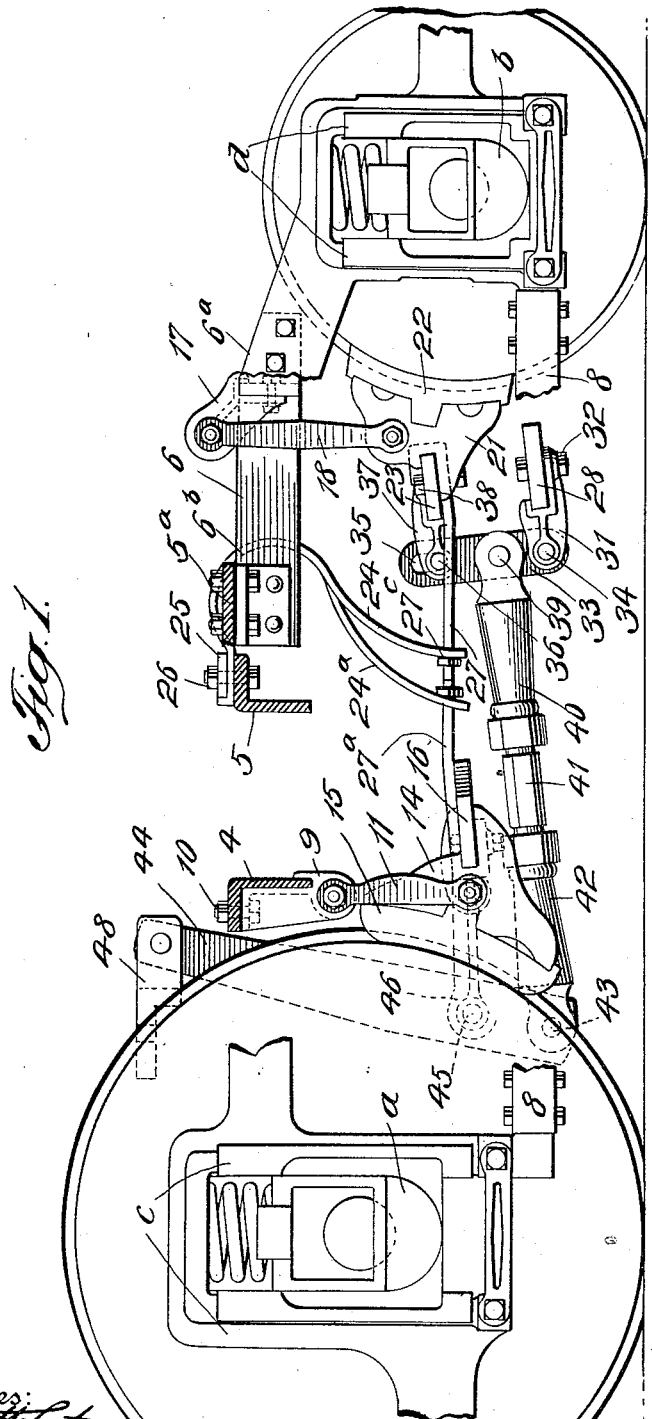

W. S. ADAMS.
BRAKE FOR CAR TRUCKS.
APPLICATION FILED JAN. 15, 1914.

1,119,772.

Patented Dec. 1, 1914.
3 SHEETS—SHEET 1.

Witnesses:

Inventor
WALTER S. ADAMS
By his Attorney

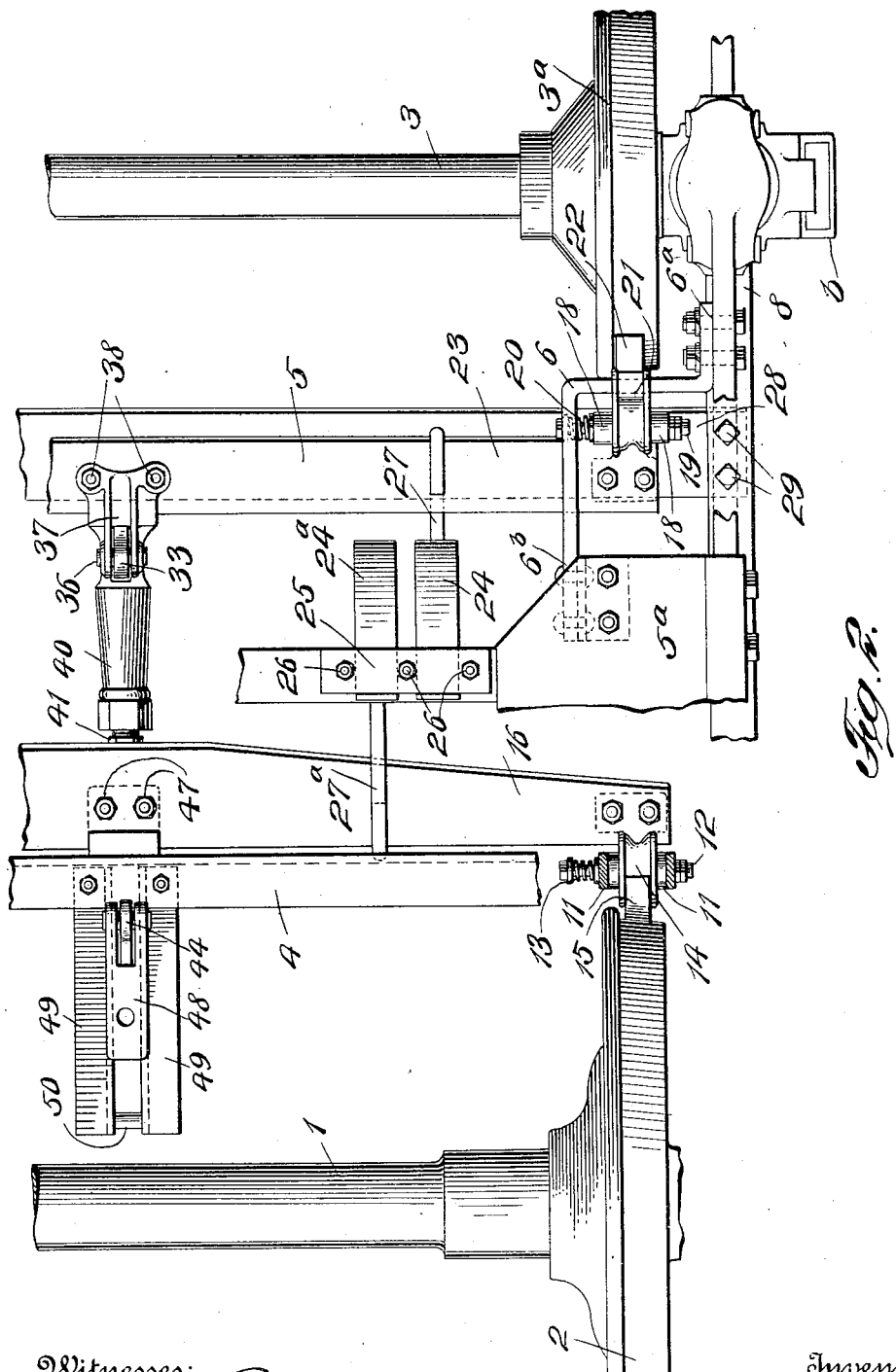

W. S. ADAMS.
BRAKE FOR CAR TRUCKS.
APPLICATION FILED JAN. 15, 1914.
1,119,772. Patented Dec. 1, 1914.
3 SHEETS—SHEET 3.
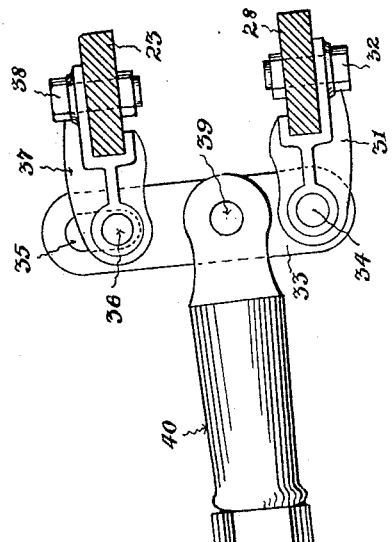
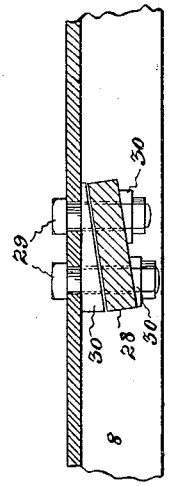
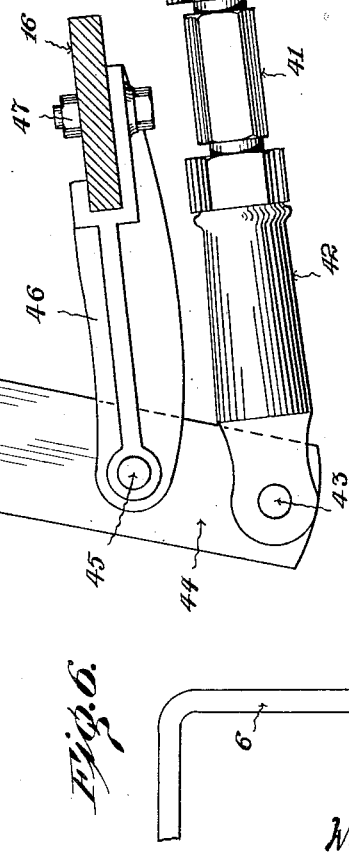
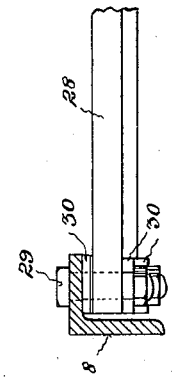
Witnesses:
H. Radzinsky
Arthur McNally
Inventor
Walter S. Adams
By his Attorney

UNITED STATES PATENT OFFICE.

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

BRAKE FOR CAR-TRUCKS.

1,119,772.   Specification of Letters Patent.   Patented Dec. 1, 1914.

Application filed January 15, 1914. Serial No. 812,199.

*To all whom it may concern:*

Be it known that I, WALTER S. ADAMS, a citizen of the United States, and a resident of the city and county of Philadelphia, State of Pennsylvania, and whose post-office address is care of The J. G. Brill Co., Sixty-second street and Woodland avenue, in said city, have invented certain new and useful Improvements in Brakes for Car-Trucks, of which the following is a specification.

My improvements are primarily adapted for use with maximum traction trucks, so-called, wherein there are larger driving wheels and smaller trailing wheels, and a bolster or otherwise constructed pivotal center located nearer the driving than the trailing wheels. In the use of trucks of this class, the motor is generally sleeved on or otherwise connected with the driving wheels and this fact and the further fact that the greater portion of the car load is carried on the driving wheels, increases the relative traction of the driving wheels, requiring greater braking pressure to be applied to the driving wheels than to the trailing wheels.

My improvements have for their special object to simplify a brake apparatus adapted to be used in trucks of this class to accomplish the above purpose and also to make them efficient, durable and to so locate them that they will be out of the way of the motors and other parts of the truck, so as not in any way to interfere with the practical operation of the truck. Some of the improvements, however, may be bodily employed in or adapted to brake apparatuses employed in connection with car trucks of other type or design.

One embodiment of my improvements is set forth in the accompanying drawing, forming part of this specification, in which—

Figure 1 is a side elevation of my improved brake, such parts only of the truck as are necessary for the support of the apparatus being shown and some of them being indicated in section; Fig. 2 is a plan view of the structure shown in Fig. 1; Fig. 3 shows the brake mechanism connected with the live and dead levers and the brake beams, on an enlarged scale; Figs. 4 and 5 are sectional views showing the manner in which the fulcrum bar is supported; and Fig. 6 shows a bar for supporting the brake shoes at the trailing wheels.

Throughout the several views of the drawings, similar reference characters designate similar parts.

As my invention does not, in any manner, extend to the truck construction, I have shown just sufficient thereof to illustrate an efficient support for the brake mechanism.

The truck, being of the usual or any desired construction, comprises driving axles 1, driving wheels 2, trailing axles 3, and trailing wheels $3^a$. The axle boxes $a$ and $b$ for the driving and trailing wheel axles are engaged by pedestals $c$ and $d$, of usual and desired construction, and these pedestals are tied together at the top by a top chord 7 and at the bottom by a lower chord or tie bar 8 in the usual manner. The truck is also provided with bolster transoms 4 and 5 of the usual angle iron construction, comprising upright and horizontal webs, which are secured to the upper chord, and gusset plates $5^a$, Fig. 2. At 6 is a brake hanger bar which is Z-shaped, in order to approach the trailing wheels $3^a$ and is secured at one end, at $6^a$, by bolts or otherwise to the side bar or top chord 7, (shown in plan in Fig. 6) and at the other end, at $6^b$, to the gusset plate $5^a$, as shown in Fig. 2. The transom 4 has brackets 9 fixed thereto by bolts 10, or any other suitable means. From the brackets 9 hang the usual hangers 11, which are supported by the usual ball and socket joints, the parts being held together by suitable bolts 12 with the usual coiled springs 13 mounted thereon. These hangers 11 run to suitable brake shoe holders 14, which carry suitable brake shoes 15 at the driving wheels 2, and these holders also support brake beams 16 which connect them. Each hanger bar 6 carries a suitable bracket 17, of the conventional form, and each bracket has suitable brake hangers 18, supported by the usual ball and socket connection with a bolt 19, provided with a spring 20, the same as the corresponding parts on the hangers 11. The lower ends of the hangers 18 in like manner carry suitable brake shoe holders 21, and each holder 21 carries a suitable brake shoe 22 which is adapted to bear on the corresponding trailing wheel $3^a$. The brake shoe holders 21 are connected by a suitable brake beam 23 which corresponds to the brake beam 16, above described.

The transom 5 is connected to the brake beams 16 and 23 by means of suitable leaf springs 24, 24ª, secured under a plate 25 by means of suitable bolts 26. The lower end of each spring 24, 24ª is connected at 27ᵇ and 27ᶜ with suitable hook bolts 27, 27ª which pass over or under a brake beam, the hook 27ª passing over the brake beam 16 and the other hook 27 under the brake beam 23, as indicated in dotted lines in Fig. 1. There are two sets of these springs, one on each side of the truck center. By the use of these springs, the brake beams will be drawn evenly on each side. In any event, these springs 24, 24ª serve as release springs to withdraw the brake shoes from the wheels.

The tie-bars 8, which join the bottoms of the pedestals of the truck frame, are united by means of a suitable fulcrum bar 28 secured to the horizontal web of each tie-bar 8 by bolts 29, and spacing blocks 30, which hold the bar 28 at the proper inclination. This fulcrum bar 28 is fixed with regard to the frame of the truck, and carries at its center a bracket 31 (see Fig. 3) held by suitable bolts 32, and in this bracket 31 is mounted the dead lever 33 on a suitable bolt or pin 34. The upper end of the dead lever 33 is slotted at 35 to receive a suitable pin or bolt 36 which is mounted in a bracket 37, fixed to the brake beam 23 by means of suitable bolts 38. A third pin or bolt 39 in the lever 33 connects the same to a brake rod casting 40 provided with a suitable adjusting nut 41 with right and left threads, one end being mounted in the casting 40 and the other in a similar casting 42 pivotally connected at 43 to the live lever 44, which is supported by a bolt 45, mounted in a bracket 46 fixed to the brake beam 16 by means of suitable bolts 47. The upper end of the live lever 44 is provided with a suitable clevis 48 which is adapted to be connected by a rod to the brake operating device. The upper end of the live lever 44 is guided by suitable guides 49 which are fixed to the transom, or in any suitable manner and connected at their outer ends by a pin 50 which limits the movement of this lever 44.

In view of the foregoing, the operation of my improved brake will be readily understood. When the clevis 48 is drawn toward the axle of the driving wheel so that the live lever 44 is shifted toward the pin 50, then the pivot 45 is also drawn in the direction of the axle of the driving wheels 2 and the bolt 43, together with the turn buckle, formed of the parts 42, 41 and 40, are shifted in the direction of the dead lever 33. The fulcrum of the dead lever 33 being at 34, a fixed point, the upper end of this dead lever forces the brake beam 23 in the direction of the trailing wheels. By the operation above described, and against the action of the release springs 24, 24ª, the brake shoes 15 and 22 are forced against their respective wheels, the pressure varying according to the design, which can be accurately determined in advance according to the distance between the pivots 43 and 45 as compared with the distance between the pivots 34 and 39 and 34 and 36. Any wear that may take place can be taken up from time to time by turning the bolt 41 which will separate the castings 42 and 40. When the tension is released from the clevis 48, the release springs 24, 24ª, will act through the hooks 27, 27ª, to withdraw the brake beams toward each other, so that the brake shoes are released from their respective wheels.

In applying the brake shoes, the fulcrum bar 28 being rigidly secured to the truck frame and the lower end of the dead lever 33 being pivotally secured to it, a portion of the pressure exerted in applying the brake shoes to the trailing wheels will be taken on the truck frame. The slotted connection of the dead lever 33 and the brake beam 23 through the bolt 36, as above described, secures an even movement of the brake beam without any material change in the amount of pressure exerted on the trailing wheels.

It will be noted that the operative portions of the brake mechanism are hung low, so as to clear the transoms and leave plenty of room for the bolster and supporting springs, while the parts are readily accessible for adjustment or repair.

While I have shown and described one embodiment of my invention, it is obvious that it is not restricted thereto but is broad enough to cover all structures that come within the scope of the annexed claims.

What I claim is:

1. In a brake mechanism for trucks, a live lever, a dead lever, a brake rod pivotally connecting said levers, so that when the brakes are applied, the live lever is pulled away from the dead lever, a fulcrum bar adapted to be secured to a truck frame, two brake beams one adjacent to each of said levers, a bracket connecting each of said brake beams with the nearest lever, brake shoe holders connected to said brake beams, and means for supporting said brake shoe holders from the frame of a truck.

2. In a brake mechanism for trucks, a live lever, a dead lever and a bottom brake rod connecting said levers, so that when the brakes are applied, the live lever is pulled away from the dead lever, a fulcrum bar and a bracket connecting said fulcrum bar with said dead lever, a brake beam and means connecting said brake beam with said dead lever, a second brake beam and means connecting said second brake beam with said live lever, and means for supporting said brake beam from the frame of a truck.

3. In a brake mechanism of the class specified, a live lever, a dead lever, and a brake rod connecting them, so that when the brakes are applied, the live lever is pulled away from the dead lever, a fulcrum bar and means connecting it with said dead lever, a brake beam and means connecting it with said dead lever, a second brake beam, and means connecting it with said live lever, means for supporting said brake beams from a truck frame, and means for withdrawing said brake beams toward each other.

4. In a brake mechanism, the combination with the transoms, the spread leaf springs pendant therefrom, brake beams, the free end of each one of the said springs being connected to each of the said brake beams and adapted to act in opposite directions to draw the brake beams toward each other, shoes carried by said brake beams and means for separating said shoes from each other.

5. In a brake of the class specified, a live lever, a dead lever, a brake rod connecting said levers, a fulcrum bar, means connecting it with said dead lever, a brake beam and means connecting it with said dead lever, a second brake beam and means connecting it with said live lever, release springs secured to said truck frame, and means connecting said release springs with said brake beam.

6. In a brake mechanism of the class specified, a live lever, a dead lever, an adjustable bottom brake rod connecting said levers, an inclined fulcrum bar and means connecting it with said dead lever, a brake beam and means connecting it with said dead lever, a second brake beam and means connecting it with said live lever, brake shoe holders secured to said brake beams, brackets secured to a top frame and hangers connecting said brackets and brake shoe holders.

7. In a truck of the class described, a live lever and a dead lever, guides near the upper end of said live lever, a bottom brake rod connecting said live and dead levers, a fulcrum bar fixed to said truck frame, means connecting said fulcrum bar and said dead lever, a brake beam and means connecting it with said dead lever, a second brake beam and means connecting it with said live lever, brake shoe holders fixed on said beam, means for supporting said brake shoe holders, release springs connected to the truck frame, and means connecting said brake beam and said release springs.

8. In a brake mechanism, a live lever and a dead lever, and a bottom brake rod connecting said levers, brake beams and means connecting said brake beams and levers, means for supporting said brake beams, a fulcrum bar and means for holding said fulcrum bar in an inclined position.

9. In a brake apparatus, the combination of the truck frame, the transverse fulcrum bar secured thereto, a dead lever pivotally supported on the fulcrum bar, a brake beam, a slotted and pivotal connection between the brake beam and the dead lever, shoes carried by the brake beam and means for operating the dead lever.

10. The combination with the truck tie bar, the transversely extending fulcrum bar, the inclined spacing block interposed between the tie bar and the fulcrum bar for supporting the latter in an inclined position, and means securing the fulcrum bar to the spacing block and tie bar together.

11. The combination with the truck frame, the fulcrum bar secured thereto, the bracket extending outwardly from the fulcrum bar, the dead lever pivoted in said bracket at its lower end and provided with a slot in its upper end, a brake beam, a bracket extending from the brake beam to the dead lever, a pin extending from said bracket through said slot in the dead lever, and a brake rod pivotally secured to the dead lever between the said brackets.

Signed at the city of Philadelphia, county of Philadelphia, State of Pennsylvania this 13th day of January, 1914.

WALTER S. ADAMS.

Witnesses:
 WM. R. MARTIN,
 H. F. MCKILLIP.

Copies of this patent may be obtained for five cents each, by addressing the "Commissioner of Patents, Washington, D. C."